March 7, 1933.　　　E. G. McDONALD　　　1,900,123
BRAKE OPERATING CONNECTION

Filed Jan. 26, 1931

INVENTOR.
EUGENE G. McDONALD
BY
ATTORNEYS.

Patented Mar. 7, 1933

1,900,123

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

BRAKE OPERATING CONNECTION

Application filed January 26, 1931. Serial No. 511,233.

This invention relates to brakes, and is illustrated as embodied in a novel operating mechanism for a system of four wheel brakes for an automobile.

An object of the invention is to provide simple means for operating the brake connections which can readily be mounted on almost any automobile chassis without interference with the propeller shaft or other parts of the chassis and also which will have a low cost without lessening its effectiveness of operation.

Having these objects in mind, one principal feature of the invention relates to the use of a transverse shaft, which is preferably substantially rigid, and which is so mounted that it has a bodily movement in addition to its turning movement in operating the levers which are connected to the brakes. This permits the use of very inexpensive but effective means for mounting the shaft on the chassis and also places it low enough with respect to the chassis frame so that it clears all of the parts which sometimes interfere with the location of brake operating shafts.

Preferably the shaft is directly secured to the brake operating levers at opposite sides of the chassis so that the levers serve as supports for the shaft without the use of additional parts. In this arrangement the levers are preferably fulcrumed on brackets or other bearing members mounted adjacent opposite sides of the chassis. The brake pedal and emergency hand lever, or equivalent driver-controlled operating means, are connected to the shaft between the sides of the chassis. These connections preferably include pendulum supports for the shaft so that breakage of the shaft at any one point will not prevent the operation of the brakes at least on one side of the car.

The above and other objects and features of the invention, including various novel combinations of parts and desirable particular constructions, will be apparent from the following description of the illustrative embodiment shown in the accompanying drawing, in which.

Figure 1:
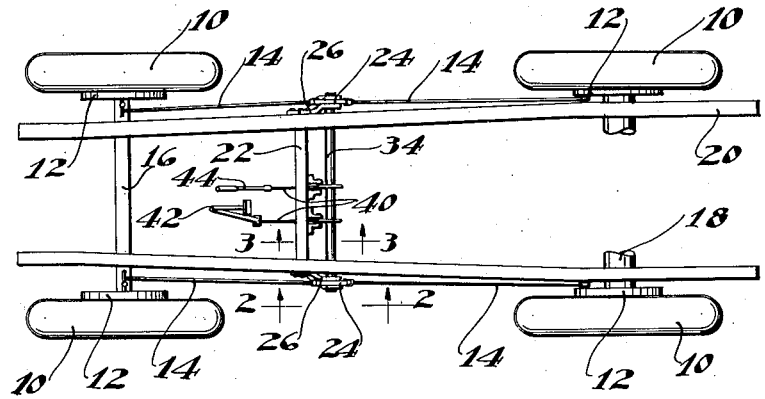
Figure 1 is a top plan view of an automobile chassis provided with my novel brake operating means.

The illustrated chassis includes road wheels 10 having brakes 12 operated by rods or cables 14 and supporting front and rear axles 16 and 18. The axles support, through the usual springs (not shown), a chassis frame 20 of any desired construction, one cross member of which is shown at 22.

In the arrangement shown, the rods or cables 14 are connected to the opposite ends of double levers 24 mounted on the opposite side members of the frame 20 by means such as stamped brackets 26 shown as adjustably bolted in fixed positions on the side frame members. The illustrated brackets 26 are slotted to embrace the bolts which secure them to the side frame members to provide for a slight adjustment, and have tongues 28 struck up therefrom so that each tongue and the corresponding end of its bracket straddle the corresponding lever 24 and carry a pivot 30 on which the lever is mounted and fulcrumed.

The pivot 30 is so arranged with respect to the length of the lever 24 as to give the desired distribution of force between the front and rear brakes on that side of the vehicle, that is where equal force is desired on the front and rear brakes, the pivot 30 will be arranged at the center of the lever. In order to provide for changing the lever arm acting on the connections 14, the levers 24 may be provided with a plurality of holes 32 for the clevis pins connecting the lever to the connections 14, so that the connection may be shifted from one of the holes 32 to another.

Figure 2:
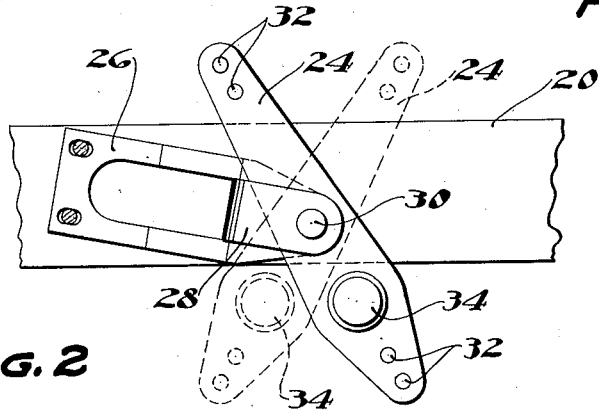
Figure 2 is a partial side elevation looking in the direction of the arrows 2—2 of Figure 1 and showing the above-described shaft and one of the levers in side elevation.
Figure 3:
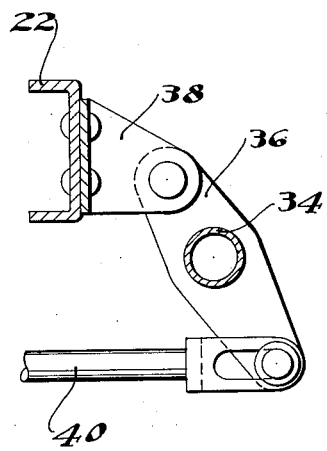
Figure 3 is a partial section on the line 3—3 of Figure 1 showing the pedal connection in side elevation.

The levers 24 are operatively connected by a transverse shaft 34 which is preferably substantially rigid and which is shown as being a hollow tube fixedly secured to the two levers at its opposite ends. The shaft 34 has a turning motion as it moves bodily from the full line position to the dotted line position in Figure 2 to operate the four brakes, but since it is not important whether or not it turns in the levers, it need not be keyed to them. It will be noted that the shaft is secured to the levers some distance from their fulcrums 30 so that it is hung unusually low and will clear the propeller shaft and other obstructions which sometimes cause great difficulty in mounting brake operating shafts.

Between its ends the shaft 34 may be supported by pendulum levers 36 pivoted on brackets 38 carried by cross frame member 22 and which are preferably extended below the shaft to have lost motion connection with rods or cables 40 extending rearwardly from a brake pedal 42 and a hand lever 44, or equivalent driver-controlled means for imparting movement to the shaft 34 between its ends, to operate the two levers 24 to apply all four of the brakes. In the arrangement shown, the shaft 34 may be operated by either the pedal 42 or the hand lever 44, each of which operates independently of the other, and the shaft has four supports, including the two levers 24 and the two pendulum levers 36, so that even if it should be broken at some point it will still always be possible to operate either the two left brakes or the two right brakes.

While one illustrative embodiment has been described in detail, it is not my intention to limit the scope of the invention to that particular embodiment or otherwise than by the terms of the appended claims.

I claim:

1. Brake operating means comprising, in combination with a chassis, a plurality of levers, pivotal connections between said levers and said chassis, connections between said levers and said brakes, and a transverse substantially rigid shaft connected to said levers some distance from their bearings and which has a combined turning and bodily movement in operating the levers.

2. Brake operating means comprising, in combination with a chassis, a plurality of double ended levers connected to the brakes, a transverse substantially rigid shaft connecting the levers, means separate from said shaft for pivotally mounting said levers on the chassis and means for moving the shaft bodily for applying the brakes.

3. Brake operating means comprising, in combination with a chassis, levers mounted on the chassis and which are connected to the brakes, a transverse substantially rigid shaft connecting the levers, means separate from said shaft for pivotally mounting said levers on the chassis and which has both a turning movement and a bodily movement in operating the levers, driver-controlled operating means connected to the shaft between the levers for translating the shaft to apply the brakes.

4. Brake operating means comprising, in combination with a chassis, levers mounted on the chassis and which are connected to the brakes, and a transverse substantially rigid shaft operatively connected to the levers and which has both a turning movement and a bodily movement in operating the levers, means separate from said shaft for pivotally mounting said levers on the chassis, together with a pivoted pendulum support for the shaft between said levers arranged to permit both movements thereof.

5. Brake operating means comprising, in combination with a chassis, levers mounted on the chassis and which are connected to the brakes, and a transverse substantially rigid shaft connecting the levers and which has both a turning movement and a bodily movement in operating the levers, together with a pivoted pendulum support for the shaft between said levers arranged to permit both movements thereof, and means connected to said pendulum support for operating said shaft.

6. A brake operating means comprising, in combination with a chassis, a pair of double ended levers which are mounted on the chassis and which are connected to the brakes, a transverse substantially rigid shaft connecting the levers, a pivoted pendulum support for the shaft intermediate said levers arranged to permit bodily movement thereof, and means for moving the shaft bodily for operating the levers.

7. A brake operating means for a vehicle comprising, in combination with a chassis having a pair of longitudinally extending frame members, front and rear brakes for said vehicle, a pair of levers each pivotally mounted between its end portions on the outside of one of said frame members and each associated with the front brake and the rear brake on the same side, a substantially rigid cross shaft having its opposite ends secured respectively to said levers at points spaced from their respective pivots, connections between each of said front brakes and an end portion of its associated lever, connections between each of said rear brakes and the other end portion of its associated lever, and means for rotating and translating said cross shaft.

8. A brake operating means for a vehicle comprising, in combination with a chassis having frame members, front and rear brakes for said vehicle, a pair of levers each pivotally mounted between its end portions on one of said frame members and each associated with a front brake and a rear brake, a substantially rigid cross shaft supported by said levers and having its opposite ends secured respectively to said levers at points spaced from their respective pivots, connections between each of said front brakes and an end portion of its associated lever, connections between each of said rear brakes and the other end portion of its associated lever, and means for rotating and translating said cross shaft.

9. A brake operating means for a vehicle comprising, in combination with a chassis having frame members, front and rear brakes for said vehicle, a pair of levers each pivotally mounted between its end portions on one of said frame members and each associated with a front brake and a rear brake, a substantially rigid cross shaft having its opposite ends secured respectively to said levers at points spaced from their respective pivots and having its longitudinal axis spaced vertically from said frame members, connections between each of said front brakes and an end portion of its associated lever, connections between each of said rear brakes and the other end portion of its associated lever, and means for rotating and translating said cross shaft.

10. A brake operating means for a vehicle comprising, in combination with a chassis having frame members, front and rear brakes for said vehicle, a pair of levers each pivotally mounted between its end portions on one of said frame members and each associated with a front brake and a rear brake, a substantially rigid cross shaft having its opposite ends welded respectively to said levers at points spaced from their respective pivots, connections between each of said front brakes and one end portion of its associated lever, connections between each of said rear brakes and the other end portion of its associated lever, and means for rotating and translating said cross shaft.

11. A brake operating means for a vehicle comprising, in combination with a chassis having frame members, front and rear brakes for said vehicle, a pair of levers each pivotally mounted between its end portions on one of said frame members and each associated with a front brake and a rear brake, a substantially rigid cross shaft mounted immediately below said frame members and having its opposite ends secured respectively to said levers at points spaced from their respective pivots, connections between each of said front brakes and one end portion of its associated lever, connections between each of said rear brakes and the other end portion of its associated lever, and means for rotating and translating said cross shaft.

12. A brake operating means for a vehicle comprising, in combination with a chassis having frame members, front and rear brakes for said vehicle, a pair of levers each pivotally mounted between its end portions on one of said frame members and each associated with a front brake and a rear brake, a substantially rigid cross shaft having its opposite ends secured respectively to said levers at points spaced from their respective pivots, connections between each of said front brakes and one end portion of its associated lever, connections between each of said rear brakes and the other end portion of its associated lever, and means for rotating and translating said cross shaft, the axis of rotation of said levers and of said cross shaft passing through said frame members but the cross shaft being spaced vertically therefrom.

13. In an automotive vehicle, front wheels and rear wheels, brakes for each of said wheels, a chassis including a frame supported by said wheels, a pair of levers, means for supporting said levers on said chassis on pivots so as each to turn about a substantially horizontal axis and each having one end normally extending below said chassis frame, means separate from said supporting means positioned beneath and extending under said chassis and connecting said levers for requiring them when moved to rotate in unison, means connecting each of said levers to a pair of said brakes, and means for moving said levers together with said connecting means.

14. In an automotive vehicle, a pair of front road wheels, a pair of rear road wheels, brakes for each of said wheels, a chassis frame supported by said wheels, a pair of levers pivotally mounted on said chassis frame, connections from one end of one lever to a front brake, connections from the other end of said lever to a rear brake, connections from one end of the other lever to the other front brake, connections from the other end of said last named lever to the other rear brake, a cross shaft supported solely by said levers and connecting them for movement in unison therewith, and means for moving said levers and said shaft.

15. An automotive vehicle comprising frame members, braking devices, levers directly pivoted on said frame members and connected to said braking devices, horizontal means connecting said levers at points intermediate said pivots and said connections to said braking devices, and means for imparting bodily movement to said horizontal means for operating said levers.

In testimony whereof, I have hereunto signed my name.

EUGENE G. McDONALD.